United States Patent
Morris-Jones

(10) Patent No.: US 7,310,162 B2
(45) Date of Patent: Dec. 18, 2007

(54) METHOD AND APPARATUS FOR PRINTING CONVENIENCE IN A NETWORKED SYSTEM

(75) Inventor: Stephen Morris-Jones, Welwyn (GB)

(73) Assignee: Xerox Corporation, Stamford, CT (US)

( * ) Notice: Subject to any disclaimer, the term of this patent is extended or adjusted under 35 U.S.C. 154(b) by 955 days.

(21) Appl. No.: 10/685,109

(22) Filed: Oct. 14, 2003

(65) Prior Publication Data

US 2005/0078335 A1    Apr. 14, 2005

(51) Int. Cl.
*G06K 15/00* (2006.01)

(52) U.S. Cl. ...................... 358/1.15; 358/1.6

(58) Field of Classification Search .............. 358/1.15, 358/1.6, 1.9, 468, 400, 435, 1.5
See application file for complete search history.

(56) References Cited

U.S. PATENT DOCUMENTS

| | | | |
|---|---|---|---|
| 5,555,351 A * | 9/1996 | Craig et al. ................. | 358/1.15 |
| 5,880,447 A * | 3/1999 | Okada et al. ................ | 235/380 |
| 5,959,530 A | 9/1999 | Lupien, Jr. et al. ........ | 340/568.1 |
| 6,008,727 A | 12/1999 | Want et al. ................. | 340/572.1 |
| 6,249,226 B1 | 6/2001 | Harrison et al. ........... | 340/572.1 |
| 6,326,946 B1 | 12/2001 | Moran et al. ................ | 345/156 |
| 6,340,931 B1 | 1/2002 | Harrison et al. ........... | 340/572.1 |
| 6,422,474 B1 | 7/2002 | Gossweiler, III et al. ... | 235/492 |
| 6,466,208 B1 | 10/2002 | Yet et al. ..................... | 345/427 |
| 6,573,916 B1 | 6/2003 | Gossweiler et al. ........ | 345/850 |
| 6,577,907 B1 | 6/2003 | Czyszczweski et al. ..... | 700/17 |
| 6,583,888 B1 | 6/2003 | Salgado et al. | |
| 6,628,417 B1 * | 9/2003 | Naito et al. ................. | 358/1.15 |

* cited by examiner

*Primary Examiner*—Jerome Grant, II
(74) *Attorney, Agent, or Firm*—Joseph M. Young

(57) ABSTRACT

A method and apparatus for printing documents on a networked system. The method includes creating at least one print job associated with a user identification code, sending the at least one job to a print queue and separately conveying the user identification code to a printing device. This method could be accomplished either with a tag system or by direct data entry at the site of a printing device. The device then obtains and prints the at least one job associated with the user identification code from the print queue.

12 Claims, 7 Drawing Sheets

METHOD AND APPARATUS FOR PRINTING CONVENIENCE IN A NETWORKED SYSTEM

CROSS-REFERENCE TO RELATED APPLICATIONS

Reference is made to commonly-assigned U.S. patent application Ser. No. 10/684,627, filed herewith, by Ball, entitled: DEVICE AUTHORIZATION SYSTEM USING OPTICAL SCANNER, U.S. patent application Ser. No. 10/685,230, filed herewith, by Ball, et al, entitled: METHOD AND APPARATUS FOR ACCESSING SPECIALITY FUNCTIONS OF A MARKING MACHINE, and U.S. patent application Ser. No. 10/685,238, filed herewith by Morris-Jones, et al, entitled: MULTIFUNCTION DEVICE SYSTEM USING TAGS CONTAINING OUTPUT INFORMATION.

The embodiments disclosed herein relate to access controls for printing devices and more specifically to devices having tag readers that can allow varying degrees of access and cause or enable certain actions to be performed.

Numerous types of marking devices offering various features and functionality to the user exist. These features include, but are not limited to, scanning, black and white copying, color copying, and faxing. Different people with physical access to the same device may have different needs, positions, or levels of security. Therefore, it may be desirable to give a user access to particular features where, for example, that user has a particular disability. It also may be desirable to limit access to particular features, or to a device altogether, where a user does not have the proper permissions. Different people may also simply have different preferences.

Further, many different types of devices are often networked together in office settings today. When multiple similar resources, such as, for example, printers are networked, they are often used inefficiently. For example, multiple people will send print jobs to one printer, while a second printer goes completely unused. It would be helpful if a user could walk to the nearest unused printer and print out his jobs.

The aforementioned concerns also apply to non-marking devices such as, for example, scanners, which scan to file.

In embodiments, to accomplish these goals and more, the user would carry a badge or card or tag (hereinafter referred to as a "tag") that contained information about the particular individual. The device being used could access the information on the tag by scanning the tag with a normal image scanner. Alternatively, the tag held by the user could communicate through radio frequency, infrared, or other wireless technologies. In the latter case, a special reader connected to the device would be used to read information from the tag.

The information read from the tag would affect which features the user had access to, if the user were granted access at all.

Disclosed is a method and apparatus for printing documents on a networked system. The method includes creating at least one print job associated with a user identification code, sending the at least one job to a print queue and separately conveying the user identification code to a printing device. The method can be accomplished either with a tag system or by direct data entry at the site of a printing device. The device then obtains and prints the at least one job associated with the user identification code from the print queue.

DETAILED DESCRIPTION OF THE DRAWINGS

Various exemplary embodiments will be described in detail, with reference to the following figures, wherein.

For a general understanding of the present invention, reference is made to the drawings. In the drawings, like reference numerals have been used throughout to designate identical elements.

Figure 8:
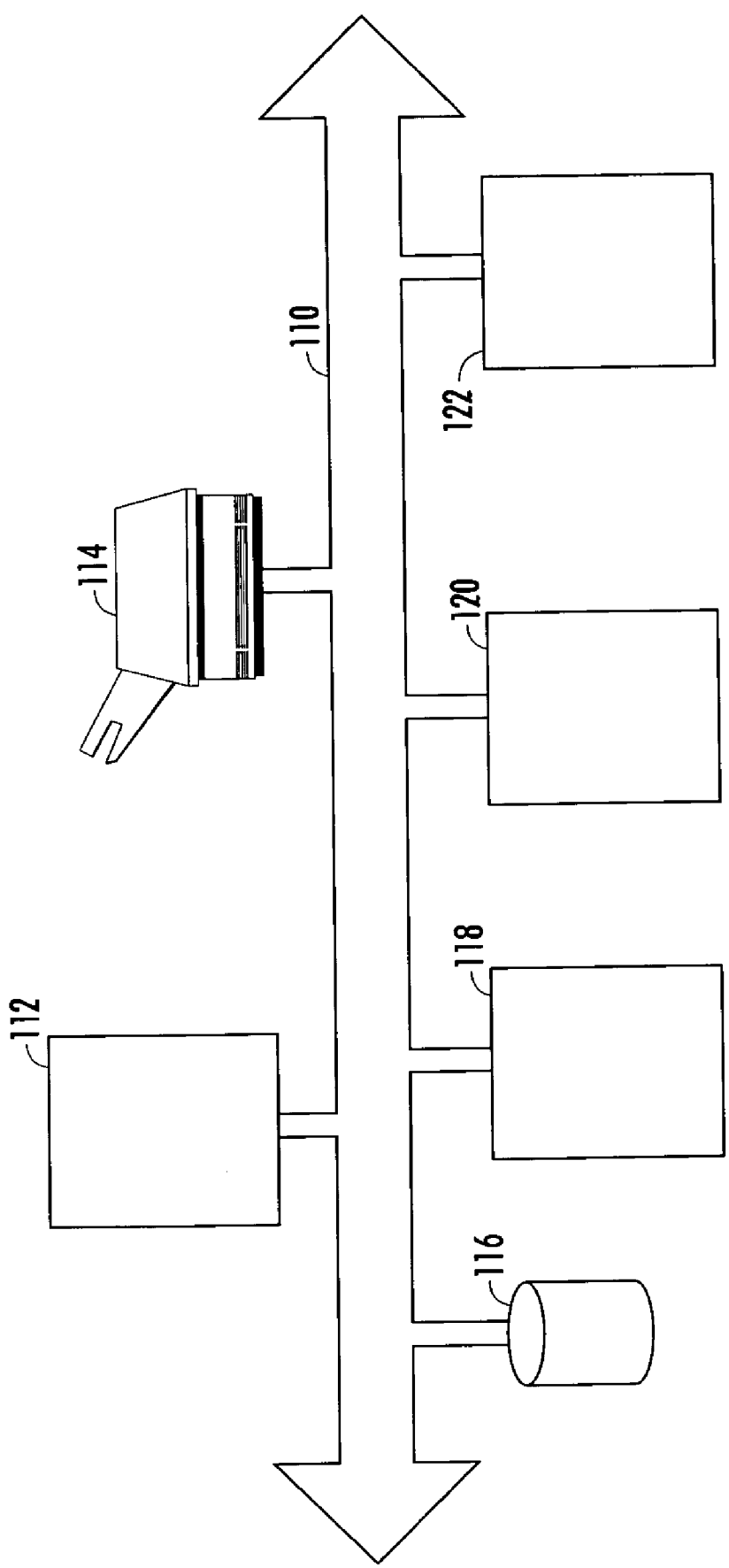
FIG. 8 is simplified diagram showing a networked document services system in which the present invention is useful.

FIG. 8 is a simplified diagram showing an example of a networked document-services system in which the present invention is useful. A network bus 110, which may be of any type known in the art, such as Ethernet or Token-Ring, interconnects a number of computers and peripherals. For example, on network 110 there would be typically any number of personal computers 112, scanners 114, servers 116, and of course printing devices 118, 120. The network 110 may further interconnect a fax machine 122, which in turn connects with a standard telephone network. What is important is that the various computers and peripherals can interact to perform various document services.

Figure 1:
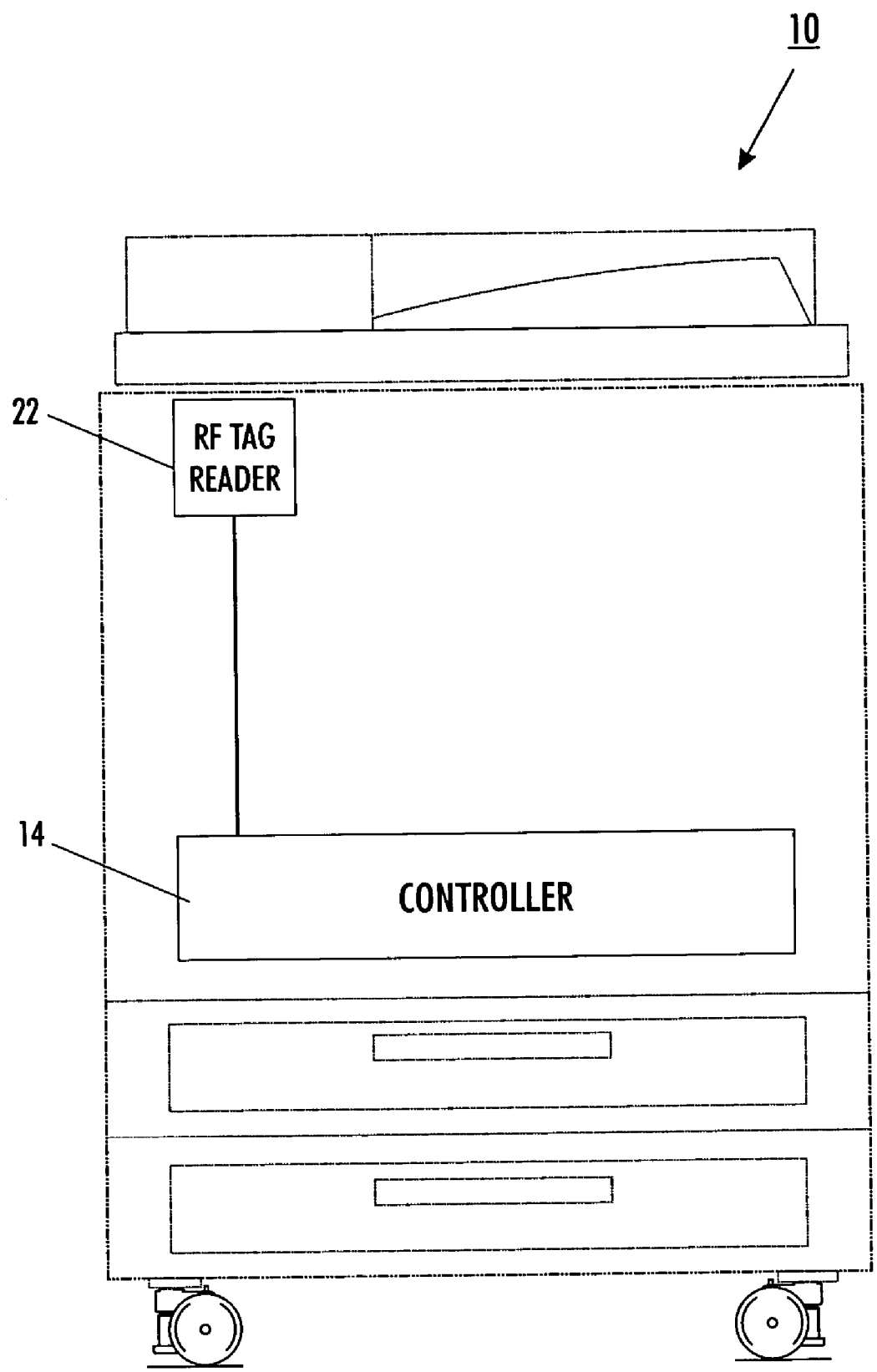
FIG. 1 is a schematic illustration of an exemplary embodiment of a printing device having a scanner.
Figure 2:
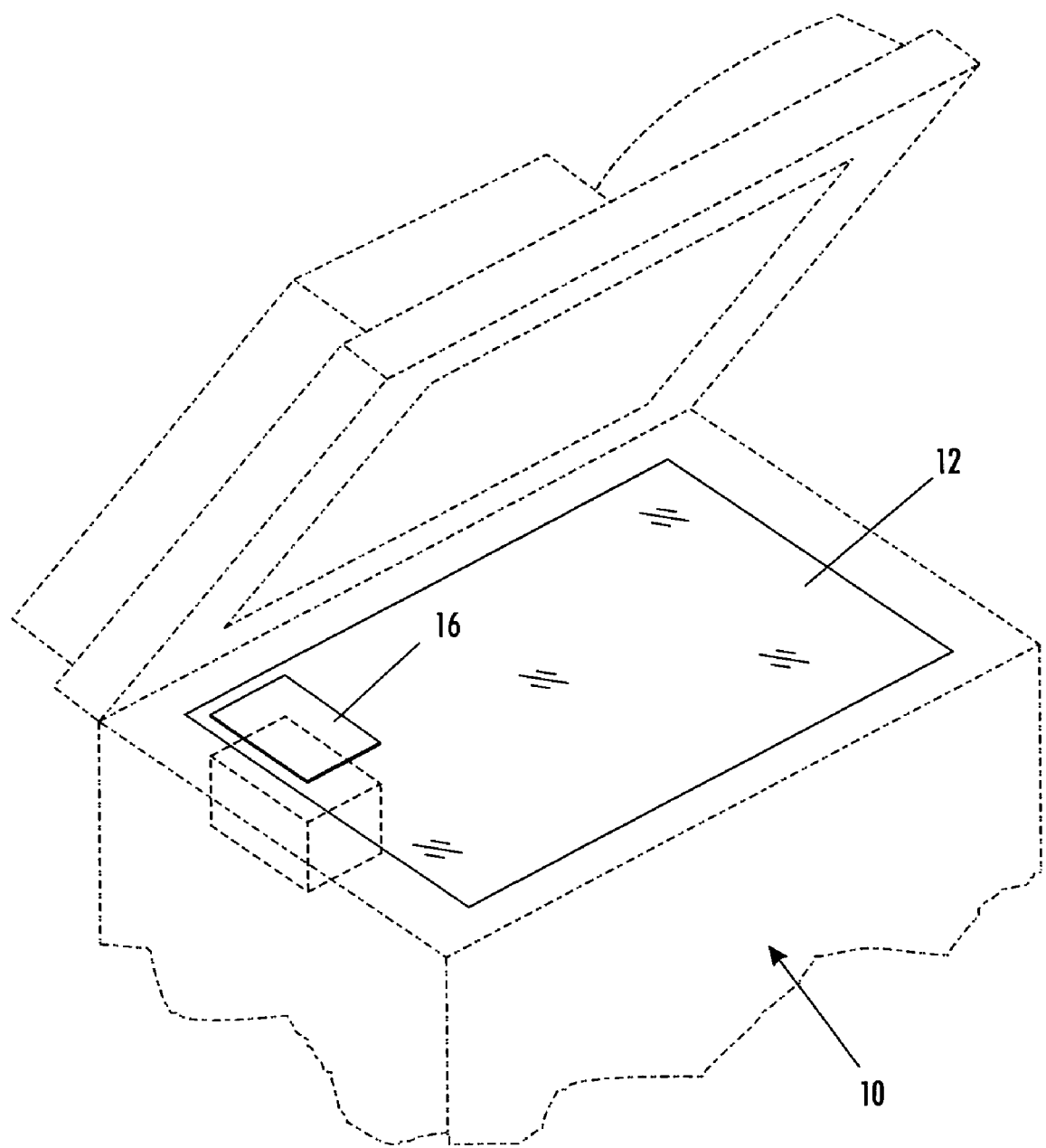
FIG. 2 is a schematic illustration of a scanning portion of the printing device of FIG. 1.

FIGS. 1 and 2 schematically illustrate a scanning/printing device 10 that would include or be used with the embodiments disclosed herein. Scanning/printing devices include, for example, a variety of printing devices such as printing devices 118, 120. Printing devices 118, 120 could be printers, copiers, or multifunction devices capable of scanning and faxing as well as printing. In embodiments, the device 10 can include a platen 12 and a controller 14 that controls the operation of the printing device. The details of the inner workings of scanning/printing devices are various and well known and generally unimportant to the embodiments disclosed herein.

Tags that can send and/or receive information are used for a variety of purposes. In embodiments, people use tags with various types of marking machines to increase efficiency or user friendliness. Exemplary functions include, for example, uniquely identifying a user, associating a user with a group, and identifying what services to make available to the user and what billing method should be used.

Figure 3:
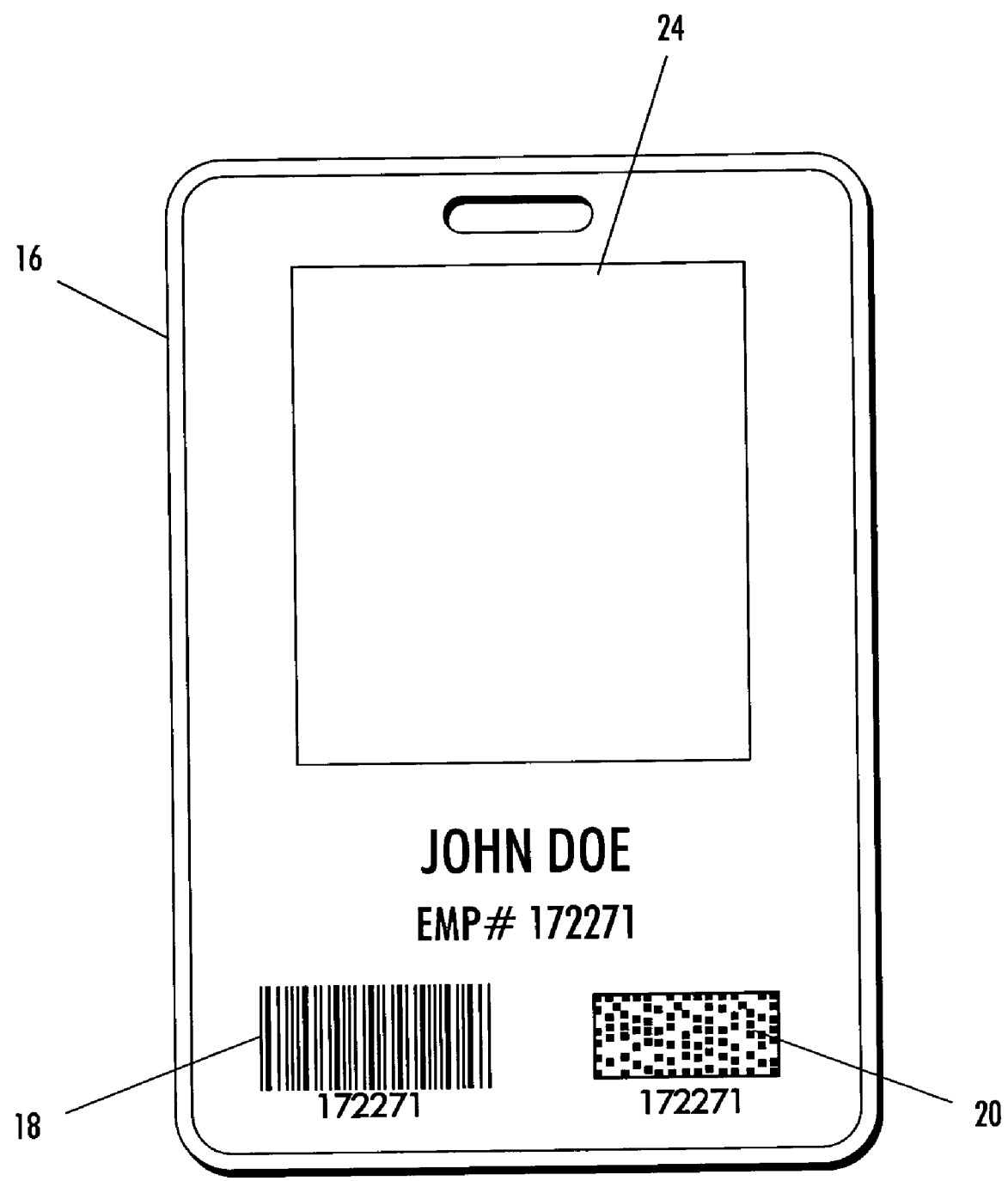
FIG. 3 is a schematic illustration of an exemplary embodiment of a badge including several different types of encoded information.

FIG. 3 illustrates a particular embodiment of a tag 16 in the form of a badge that may be used to access features of the device 10. Tags could also be incorporated into other items that a user may carry, such as, for example, broaches, tie clips, pens, containers, or even a business card. While various embodiments are contemplated, the term "tag" will be used throughout the description to describe any personally carried object that is capable of being scanned or otherwise read by a device, such as the printing device 10.

The tag 16 will have one or more features that control access to the device 10. For example, the tag may contain a bar code 18 or glyphs 20 on its face or backside. Bar codes and glyphs are well known in the art. Alternatively, the tag 16 may contain an RF transceiver or other internal device that enables wireless communication with the device 10. Most likely, in practice, a tag will not have more than one of these features. However, tags that are multiply encoded with information may also be used.

In embodiments, depending upon what information was stored on a tag, the tagholder could access one or more features of a printing device. The device 10 would query the tag for identification or instructions. For example, the user could place his tag 16 on the platen 12 of the device 10, where the device would optically scan the tag. Here the scanning portion of the device performs the tag reading function. For example, the device could read the bar code 18 or glyphs 20 and the information scanned would be compared with that stored in its internal memory or storage or the memory or storage of a connected device. The device could also scan the photograph of the tag holder and grant access based upon a comparison to the tag holder's image stored in a database. In embodiments, the tag or badge would contain the photograph of the tag holder in a central field 24. The level of access granted would be based upon information correlated with the tag holder's image. The controller 14 could also correlate information from a combination of these sources. Regardless, depending upon what information the device read from the tag, the device would grant access to various features. For example, the controller 14 could grant full access, access to some features but not others, or no access at all.

In other embodiments, the tag 16 can contain electronic components and the device 10 can include a special tag proximity reader/scanner 22 used to obtain information from the tag 16. The reader/scanner 22 is operably connected to the device 10. Electronic tags use a wireless technology or technologies to alert a suitably equipped marking machine when the tag approaches such a marking machine. Wireless technologies include IR, RF (e.g., Bluetooth and IEEE 802.11), among others.

Regardless of what type of tags and interrogation systems are used, a tagholder would bring his tag sufficiently close to the reader 22. The reading device would send a query signal to the tag for information regarding the tagholder. The tag would in turn send its information to the reading device or to another receiver within the device. This information would be conveyed to the controller 14, which would use the information received from the tag 16 to grant access to the tagholder. The device 10 may grant any number of features from all to none to the user based upon what information is stored in or on the tag 16.

Tag technology is well known in the art and has been described in a variety of patents including, but not limited to U.S. Pat. Nos. 5,959,530, 6,249,226, 6,326,946, 6,422,474, 6,446,208, and 6,573,916, the disclosures of which are hereby incorporated by reference in their entirety.

FIG. 1 illustrates the tag reader 22 as being located on the front of the device 10 in FIG. 1. However, the tag reader could be located almost anywhere on the device 10. Most likely it would be on top or the upper front for the sake of convenience.

Differential access to device functions and features serves many purposes. The simplest examples are related to security issues. For example, tags can be used to determine whether access is granted, and if access is granted, whether it is granted to all the features of a device. A person desiring access to the device must possess a tag that has been properly encoded to access that device. A company or other organization can control access to a machine by granting or denying permissions to a person based upon the information contained in that person's tag. For example the tag can identify security level or department codes.

Access may be limited to particular features of a machine rather than the whole machine. For example, access to more costly or potentially costly features could be limited. If, for example, a printing device has a built in facsimile machine so that the user may scan documents to fax, the manager of an office may want to limit access to that function to a select number of individuals with particular responsibilities so that it is not abused. Those select individuals would have their tags encoded such that they can access the facsimile machine, while the other employees would not.

Even scanning to email may be a problem if people using the machine are able to do so anonymously. A tag can contain information such as the user's email address and/or other user identifying codes or information. In embodiments where the tag must be read before a document can be scanned to email, the user's tag can convey the user's email address to the recipient of the email.

In addition to controlling individual access, the disclosed system could be used to limit group access as well as individual access. For example, where the office is part of a larger organization, the manager may want to limit access in whole or in part to the employees under his control. In some buildings, multiple business units, each with its own budget center, occupy the same floor. In some cases, entirely different businesses may share a space. For budgetary reasons, a manager may wish to limit access to people in his particular unit or business. Further, if the owner moves the machine from one department to another, an owner could reprogram the machine to allow access to the employees of the new department and prevent access to employees of the old department.

In addition, a business may want to deny access to a previously authorized person, such as, for example, a terminated employee. In most cases, the individual would return the tag before that employee leaves. However, collecting the tag may not always be so simple. To reduce any problems that may occur, the management may deactivate the user's tag so that the former employee no longer have access to any equipment they formerly did. This may be an action taken by the tag issuer or it may be part of a natural time lapse. The tag may be given an expiration date upon which it will no longer successfully access all or part of a device. For example, the tag issuer may give the user temporary access to diagnostic software and routines located on a device, thus allowing the tag issuer to maintain control of who has access to the device.

Alternatively, a tag reading system may be used to access specialty features of a device.

For example, if the tagholder is somehow disabled, the tag 16 may contain information about the holder's specific disablement. The controller 14 could enable or activate particular features that most workers would not use or need, or perhaps disable particular features that would interfere with the user's ability to use the device. For example, The device 10 could activate a special control panel, auditory prompts, or a larger font size on a user interface, among many other possibilities. The activated/disabled features would depend on the particular user's disability.

Other specialty features include specialized diagnostic software. Authorized service providers could also use the tag system described herein to access diagnostic software loaded on a device. Devices, such as, for example, printing devices, may include specialized software or routines that diagnose components or systems within a machine. Access to these routines could be limited to particular tag holders. When the machine is not functioning properly, authorized service technicians access these routines to perform diagnostics on the machine. The company selling or leasing the machines could issue special tags to authorized independent service providers, which the providers would use to access the diagnostic routines. Unauthorized independent service providers would be unable to access the diagnostic routines. The customer may or may not be granted access to these routines.

Devices equipped with a tag reader could also store the user ID's of those who accessed the printing devices. If someone were to clear a jam in a machine or shut it down, a subsequent user would be able to determine who that person was.

Tags may also be used to convey information corresponding to a job, printing instructions, or even limited print jobs to the printing device.

For example, the tag 16 could contain information such as, for example, a fax number or numbers or a list of email addresses necessary to complete a job that a user may want. The text or image portion of the print job could originate from a remote computer or scanner or the user could scan that portion of the job at the printing device. For example, the user may walk up to a printing device and select scan to myself as an option. The printing device could scan the user's badge 16 before during or after scanning the document to be sent. The printing device would read the user's email address and then send the scanned image to the user. The user may also have email addresses for a distribution list such as a work group, or an administrative assistant. The tag may also contain information about how the owner of the printing device will bill the user for using the device.

The tag may also contain the user's personal printing preferences. In embodiments, upon the scanning of a user's tag, a printing device could adjust a variety of formatting and finishing options to the user's preferences. These include paper type, font size, spacing, tabs, etc.

Finally, the tag 16 may also contain limited print jobs itself. Personal signature or contact information is contemplated as well as some lengthier pieces. For example, embodiments can employ low cost tags that transmit pre-loaded data. For example, the tag itself could contain instructions for the pre-programmed diagnostic routines discussed previously.

In particular embodiments, the tags could be limited to transmit only. Such low cost tags can be used for product promotions in the form of advertisements in which the tag is embedded, advertising on the tag, or variations on this theme with the tag including data allowing downloading and printing of information, manuals, handbooks, etc., related to the promoted item.

Figure 4:
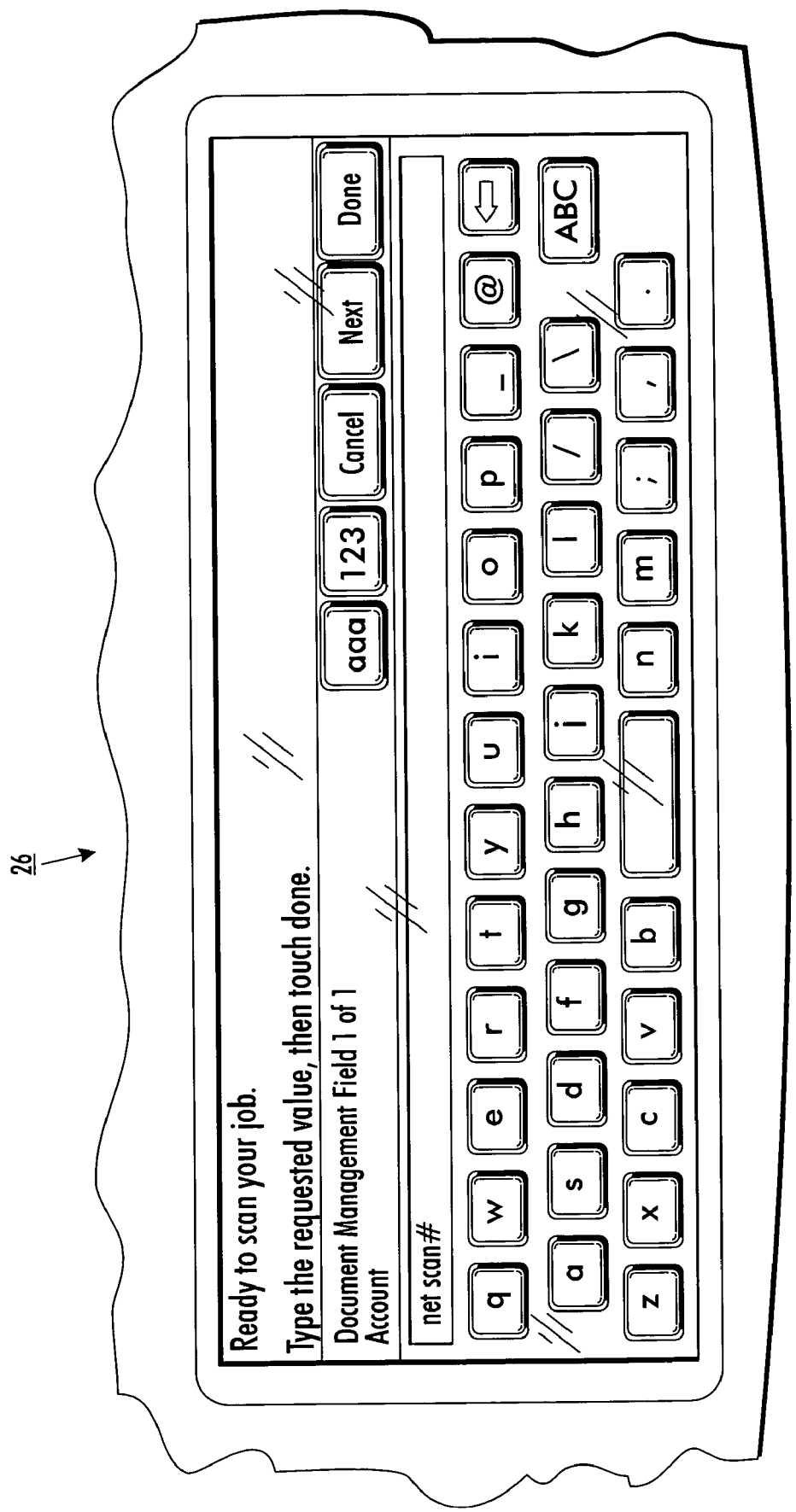
FIG. 4 is a schematic illustration of an exemplary embodiment of a user interface.

Tags can be also be used to enhance a networked system of computers such as that illustrated in FIG. 4. Instead of sending documents through the network 110 to one of the connected marking machines 118, 120, a document could be printed generically to the network 110 and stored, for example, on the server 116. The document would be associated with identification information of the user. This could be done in numerous ways. For example, most workplace users need to log on to their computers. Print jobs could be correlated to a user's login ID's, which would be encoded onto the user's tag. Once a job was sent to the server 116, the user, bearing a tag 16, could set off for one of the marking machines 118, 120. When the user comes into range of the selected marking machine (for example marking machine 118), the machine would read the tag 16 and pull the print job (along with any other stored print jobs) associated with the user's information from the server.

The previously described system could be accomplished without tags as well. The user could simply enter a login ID through a user interface connected to one of the printing devices 118, 120. See FIG. 4. The interface in FIG. 4 is a virtual keyboard 26 and is just one example of a local interface. The interface may be touch screen or push button. The interface could either be integral with the printer or it could be a PC hardwired to the printing device 10. As with the scanned tag, once the user's ID is determined, the printing device could gather that user's print jobs from the main server 116.

Tags could also be used to move print jobs forward in a queue, whether they are stored at the printing device or that are stored on a networked device such as the server 116 in FIG. 8. In embodiments, the tag could be programmed with a priority code that would move the print jobs of a favored user to the front of the print queue. This would allow a high priority user to collect his printouts first.

Figure 6:
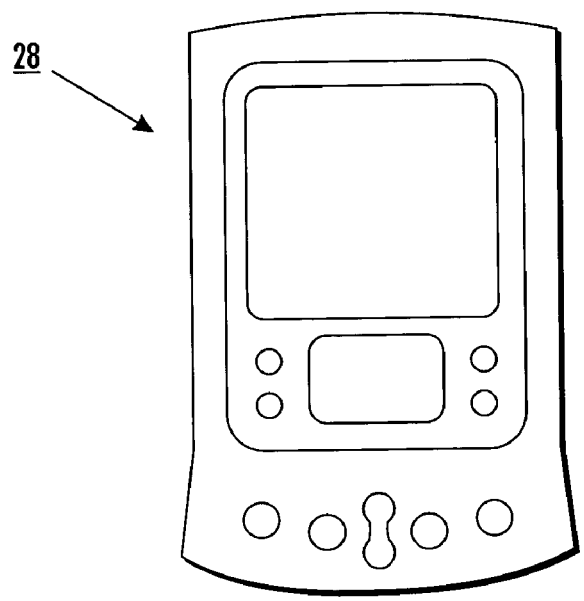
FIG. 6 is a schematic illustration of an exemplary embodiment of a Personal Digital Assistant.
Figure 7:
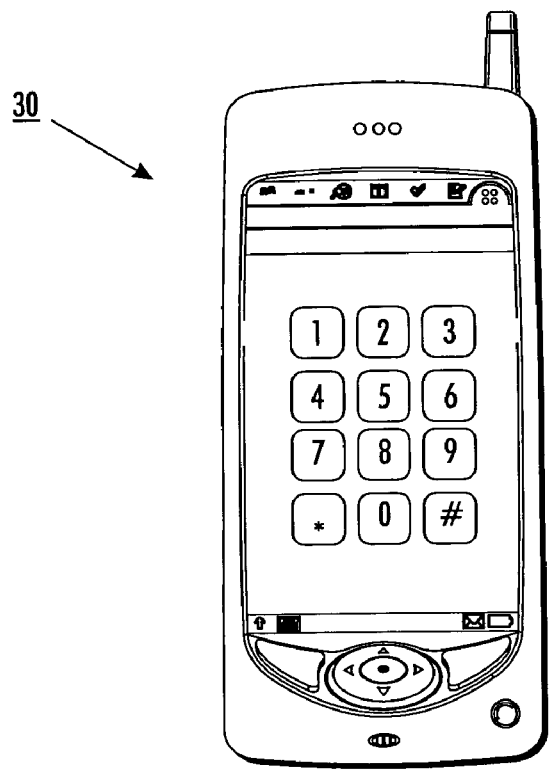
FIG. 7 is a schematic illustration of an exemplary embodiment of a cellular telephone.

The functions of electronically and optically read tags may also be incorporated into other wireless devices such as, for example, personal digital assistants (PDAs) 28 and cellular telephones 30, such as those that use Short Message Service. FIG. 6 and FIG. 7 illustrate an example of a PDA and an example of a cellular telephone, respectively. The tag readers of marking machines could include this capability as well, which is another way that the machine could communicate with the PDA or cellular telephone.

Figure 5:
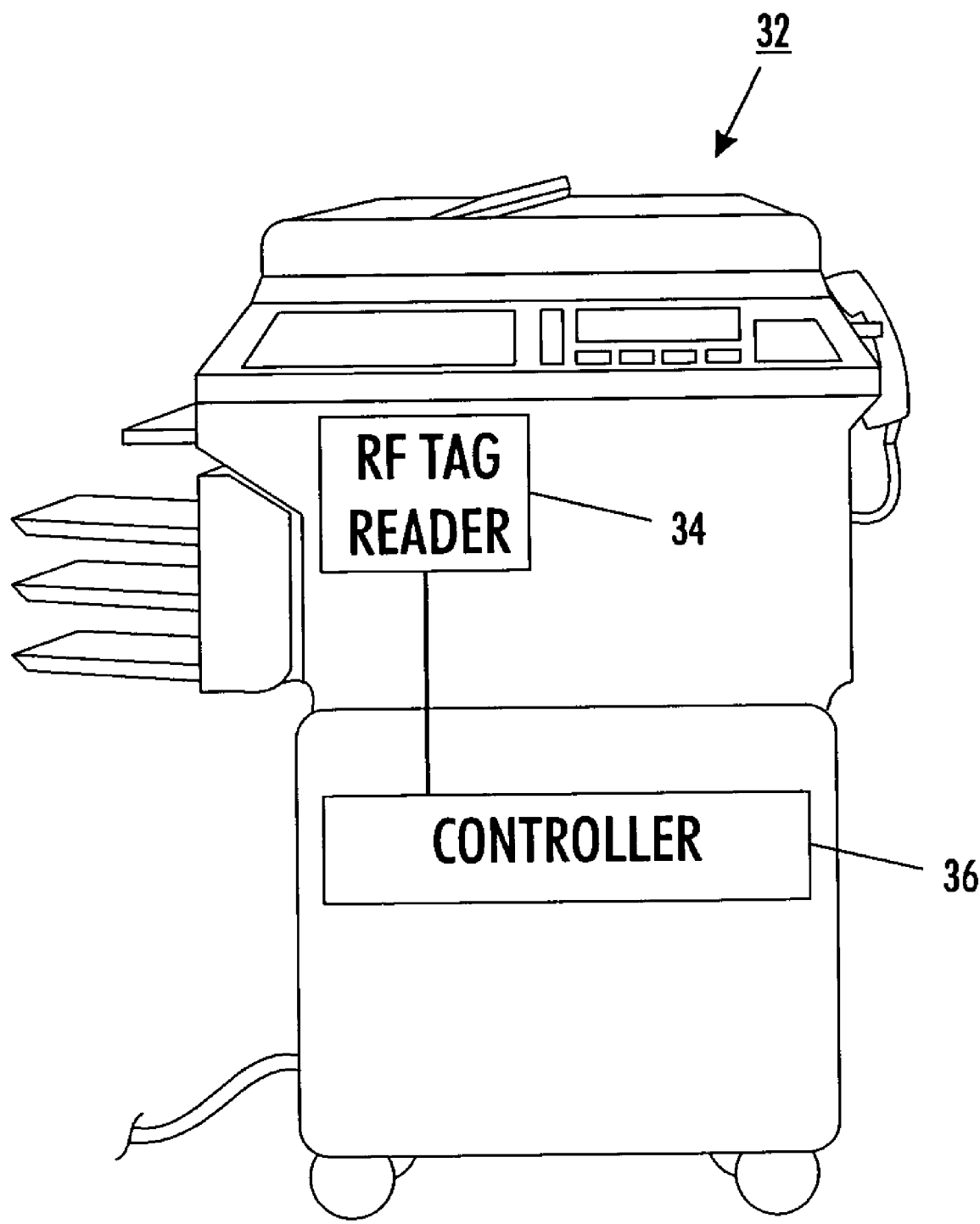
FIG. 5 is a schematic illustration of an exemplary embodiment of a facsimile machine.

Once again, most of the methods disclosed herein could still be used if the device being used were a facsimile machine, such as the facsimile machine 32 shown in FIG. 5. The facsimile machine 32 could also be equipped with a card reader 34, which in turn would be connected to a controller 36. The system would work in much the same way as it did for the printing or multifunction device 10. For example, a tag system could be used with the facsimile machine 32 to retrieve fax jobs from a queue or only limit the functionality available to the user, such as, for example, local phone numbers versus long distance numbers.

While the present invention has been described with reference to specific embodiments thereof, it will be understood that it is not intended to limit the invention to these embodiments. It is intended to encompass alternatives, modifications, and equivalents, including substantial equivalents, similar equivalents, and the like, as may be included within the spirit and scope of the invention.

The invention claimed is:

1. A method for printing documents on a networked system, comprising:
   creating at least one print job associated with a user identification code;
   sending the at least one job to a print queue;
   conveying the user identification code to a printing device; and
   obtaining and printing the at least one job associated with the user identification code from the print queue,
   wherein a tag is used to convey the user identification code to the printing device.

2. The method of claim 1, wherein the tag is an electronic tag and the printing device includes a tag reader to read the tag.

3. The method of claim 2, wherein the user identification code is conveyed through a radio frequency signal.

4. The method of claim 2, wherein the user identification code is conveyed through an infrared signal.

5. The method of claim 1, wherein the printing device includes a scanner.

6. The method of claim 5, wherein the scanner is used to scan the tag.

7. The method of claim 6, wherein the tag contains a bar code.

8. The method of claim 6, wherein the tag contains glyphs.

9. The method of claim 5, wherein the tag is part of a portable item.

10. The method of claim 9, wherein the portable item is a badge.

11. The method of claim 9, wherein the portable item is one of a broach, a tie clip, a pen, and a container.

12. The method of claim 1, wherein the print queue is kept on a server connected to the networked system, but remote from the printing device.

* * * * *